Figure 1:
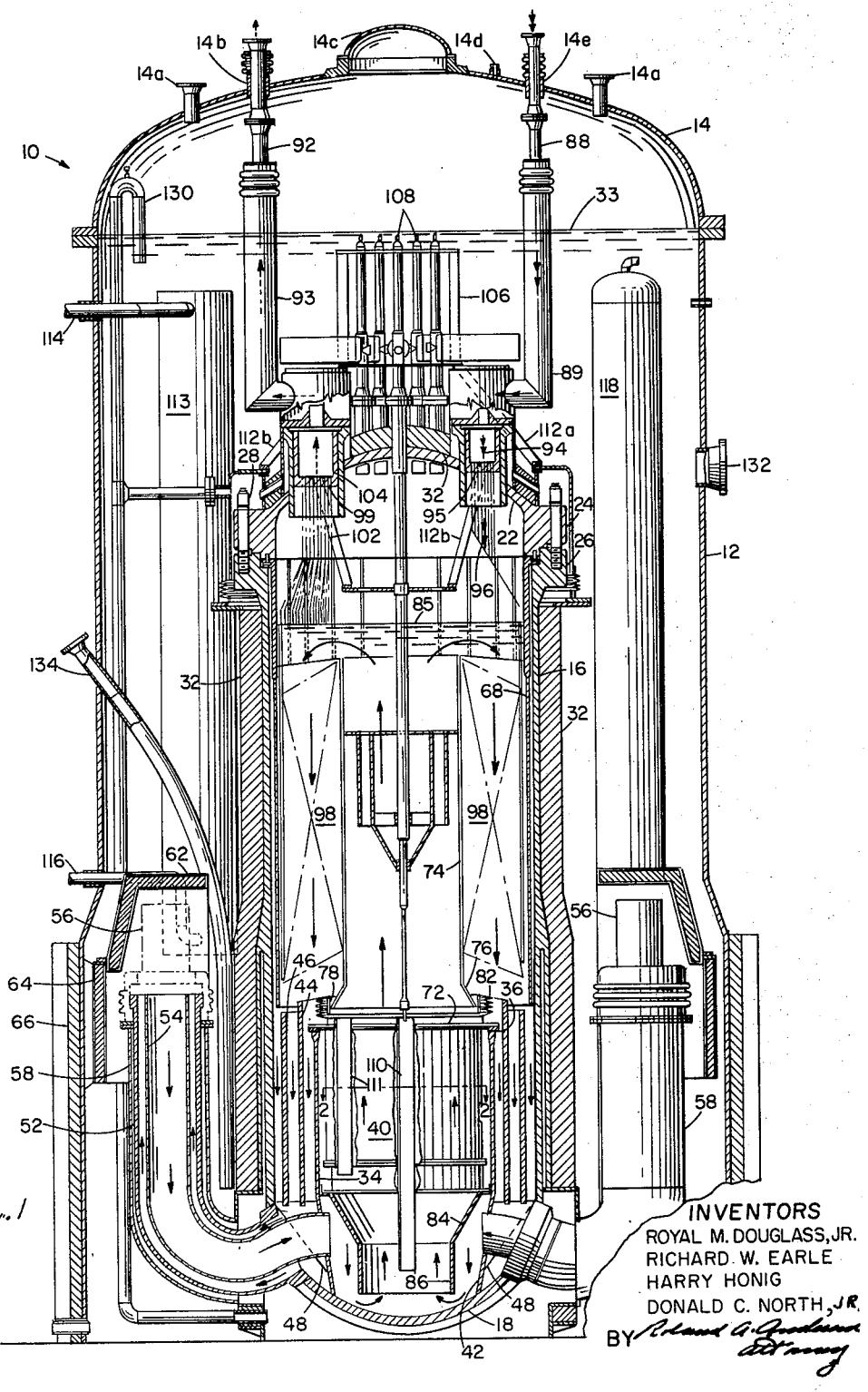

INVENTORS
ROYAL M. DOUGLASS, JR.
RICHARD W. EARLE
HARRY HONIG
DONALD C. NORTH, JR.

INVENTORS
ROYAL M. DOUGLASS, JR.
RICHARD W. EARLE
HARRY HONIG
DONALD C. NORTH

United States Patent Office

3,151,034
Patented Sept. 29, 1964

3,151,034
CONSOLIDATED NUCLEAR STEAM
GENERATOR ARRANGEMENT
Royal M. Douglass, Jr., Akron, Ohio, and Richard W.
Earle, Harry Honig, and Donald C. North, Jr., Lynchburg, Va., assignors to the United States of America as represented by the United States Atomic Energy Commission
Filed Aug. 23, 1962, Ser. No. 219,086
8 Claims. (Cl. 176—53)

The present invention relates to a consolidated nuclear steam generator arrangement and more particularly to an arrangement of a nuclear reactor incorporating a steam generator, primary circulating pumps and certain auxiliary systems contained within the walls of a single confinement.

Due to the long periods of operation possible with a nuclear reactor as a source of power aboard ocean going vessels there has been increasing interest in such power sources. Previous designs of nuclear power arrangements for such utilization are considered to be quite successful, for example, the reactor shown in U.S. Patent No. 2,982,713, entitled, "Merchant Marine Ship Reactor," by Sankovich et al. However, certain disadvantages have come to be associated with this type of power plant. A principal one is the large amount of space occupied aboard the vessel by the nuclear reactor and the remaining system equipment making up the power plant. In view of the large amount of shielding generally required for shipboard use and the length of piping and associated equipment necessary to connect the apparatus up, it has been suggested that much of the units or apparatus making up such a power plant might be combined to obtain a more compact arrangement. Should the units making up such a power plant be successfully consolidated into a unified arrangement many advantages would be obtained including that of tremendous savings of volume and weight which are at a premium aboard ship.

Heretofore, attempts to obtain the consolidation of the nuclear reactor power plant assembly have not been successful due to the existence of many problems considered unsolvable. For example, it is necessary in consolidating the equipment mentioned above to insure that every portion of the system where necessary will receive adequate cooling and that an adequate heat sink be provided. In addition, it is necessary to arrange the units in such a way that there will be adequate means for maintaining the equipment within the containment. Furthermore, there must be adequate emergency storage provisions made for primary system waste when and if the usual waste disposal methods cannot be used.

The present invention provides a consolidated arrangement of nuclear fission reactor and steam generation equipment and much of the required auxiliary apparatus within a single containment in such a fashion that the arrangement is both practical, efficient, and safe.

In accordance with this invention there is provided a containment vessel which is filled almost completely with water at approximately atmospheric pressure and a nuclear pressure vessel submerged completely within the containment water. Contained within the pressure vessel is the nuclear core and the steam generation equipment which produces steam to drive the power generation equipment of the vessel. A unique aspect of this invention is the shielding of the reactor vessel from the water by a thick layer of lead bonded directly to the vessel. This lead, in addition to providing the thermal insulation, also serves as an effective gamma shield. The reactor itself is a closed cycle system in which the total primary fluid (light water) and the steam generation equipment are both contained within the reactor vessel. This is accomplished by providing a closed circulation circuit in which the flow of the primary fluid goes upward through the core, down through the steam generators, and then through circulating pumps and back to the core. The containment and its water provide additional shielding as well as a decay heat storage sink for the reactor and is part of the emergency decay heat removal system. In addition, the containment water serves other functions which are described below.

Under the unique arrangement combining the various elements of a nuclear fission power plant in accordance with this invention it is possible to obtain an efficient heat generation system with a great saving in space and other costs and to retain a high safety factor which, of course, is necessary for shipboard use.

It is thus a first object of this invention to provide an arrangement of a nuclear reactor and steam generation equipment within a single containment.

Another object of this invention is a consolidated nuclear steam generator arrangement with an emergency decay heat removal system.

Still another purpose of this invention is a unified nuclear steam generation power plant in which pressurized light water is utilized as the moderator-coolant of the nuclear core.

Another object is a combined nuclear fission and steam generation arrangement providing geometry which permits maintenance of equipment within the containment and adequate storage of primary system wastes when required.

Figure 2:
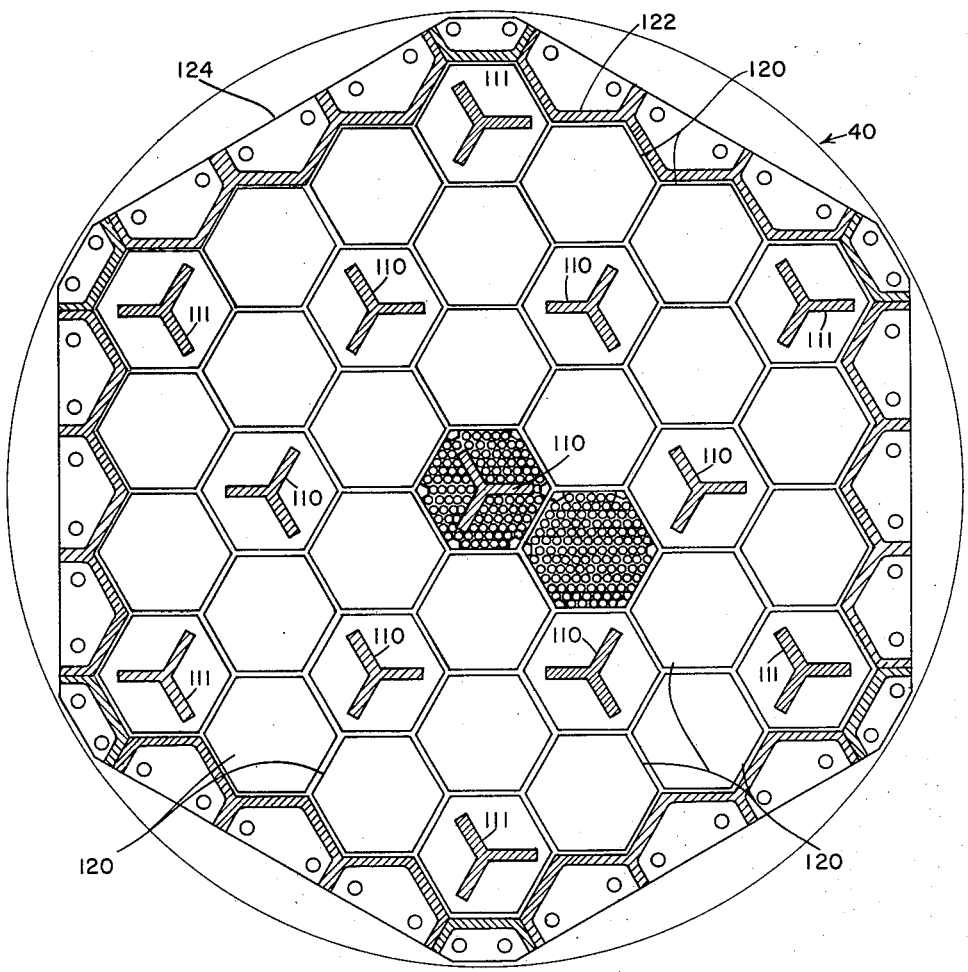

Other objects and advantages of this invention will hereinafter become more evident from the following description of a preferred embodiment of this invention taken with reference to the accompanying drawings in which:

FIG. 1 is a section elevation view of a preferred form of this invention partially schematized; and FIG. 2 is a view along 2—2 of FIG. 1.

Referring to FIG. 1 there is illustrated a preferred embodiment of the consolidated nuclear steam generator arrangement 10 consisting of an outer containment vessel 12 which is somewhat cylindrical in shape and provided with a closure 14 which is semi-hemispherical.

Closure 14 is provided with ventilation nozzles 14a, steam line nozzles 14b, an access hatch 14c, relief valve nozzles 14d and feedwater line nozzles 14e.

Confined within containment vessel 12 is a pressurized nuclear vessel 16 which is generally cylindrical and has a semi-hemispherical lower portion 18 and a closure 22. The latter has a flange 24 which at its lower end mates with vessel closure flange 26. Flanges 24 and 26 are held together by a plurality of bolts 28 as is understood in the art. Pressure vessel 16 is provided with thick lead shielding 32 for a purpose to be later described. The water in containment vessel 12, which need be only at atmospheric pressure, fills up its container to level 33. The air space provided above the water accommodates increases in water volume due to increases in water temperature and any resulting from a leak in the primary system.

Within reactor vessel 16 there is provided a core support cylinder 34 which supports by way of an upper flange 36 a nuclear core 40 containing the fuel elements of this reactor. Core 40 may be similar to the one described in the aforementioned U.S. patent or have the configuration to be more particularly described below. Cylinder 34 is supported by a frusto-conical section 42 welded or otherwise attached to the bottom section 18 of vessel 16. Surrounding core 40 are a plurality of cylindrical thermal shields 44 and 46 supported by radially extending plates 48 attached to conical support section 42.

Extending out from reactor vessel 16 adjacent the bottom are four equally spaced nozzle tubes 52 which after extending through the lead shielding 16 rise perpendicular for a short distance.

Within each tube 52 there is a second tube 54 extending through the conical section 42 and terminating a short distance above nozzle tube 52. An outer tube 58 encloses the pressure vessel nozzle tube 52. Extending from and above nozzle tube 52 is a pump construction 56 which as will be more particularly described further below receives primary water from the annular space formed by pipes 52 and 54 as indicated by the single solid arrows and pumps the primary fluid under pressure back through tube 54 into reactor vessel 16 within conical section 42.

Pumps 56 are located above the top of core 40 to insure that during shut-down if the pumps are removed for maintenance or other purposes the water level within vessel 16 will never drop below the top of core 40. Lead shielding in the form of segments 62, 64 and 66, are provided as shown.

Returning to the interior of reactor vessel 16, there is shown illustrated a cylindrical skirt 68 extending down from flanges 24 and 26 from the inner wall of pressure vessel 16 to obtain thermal shielding in this particular region, and also to serve as outer baffle and support for the steam generator to be described below. Core 40 is provided with flange 72 resting on flange 36 of support cylinder 34 sealing a chimney 74 which is generally cylindrical in shape and open at both ends. The lower portion of chimney 74 has an expanded section 76 with a bottom cylindrical section 78 and a bellows 82 as illustrated to close off the bottom of chimney 74 and core 40 and at the same time to provide for thermal expansion of chimney 74. Extending down from core 40 there is a frusto-conical section 84 and a cylindrical portion 86 terminating just above the bottom of vessel 16. It will thus be seen that frusto-conical section 42, cylinder 34, and chimney 74 form an open-ended chimney unit extending from the bottom of vessel 16 to a point just below the level 85 of the primary water.

In the arrangement just described it will be apparent that primary water coming under pressure from pumps 56 through tubes 54 into section 42 will enter the bottom opening of section 82 to flow up through core 40 and chimney 74. The primary water leaving chimney 74 at the top will then travel downwardly as indicated by the single solid arrows through the annular space between chimney 74 and skirt 68 down through and between the thermal shields 44 and 46 to return to pumps 56 by way of the annular space provided between tubes 54 and 52. Thus, there is provided a closed cycle primary flow system. The primary fluid is maintained at a level indicated at 85 with a closed steam space provided above this level and within closure 22. The space above level 85 is filled with steam and acts as a self-pressurizer as will be later described. Electrical heaters (not shown) just below primary water level 85 and water nozzles (not shown) in closure 22 may be used to control the pressure within this steam space.

Extending into pressure vessel 16 through top closure 22 from nozzles 14a and 14b, respectively, are three equally spaced feedwater supply lines 88 with insulation 89 and three equally spaced steam lines 92 with insulation 93 for withdrawing the steam developed within vessel 16. Feedwater supply lines 88 enter the vessel 16 and terminate in a plenum 94. Extending down from tube sheet 95 are tubes 96 which convey the feedwater to steam generators 98 disposed in the annular space between chimney 74 and the inner wall of skirt 68. Steam generators 98 and its connecting tubes are only schematically illustrated as any convenient type of such equipment as known in the boiler art may be utilized to transfer the heat developed within the reactor to the water flowing therethrough to form steam. Return tubes 102 extend from steam generators 98 up through tube sheet 99 to a plenum 104 from which steam conduits 92 extend out of reaction 16 and up through the wall of containment 12 as illustrated.

A control rod drive support structure 106 is mounted on top of closure 22 for supporting control rod drive mechanisms 108, one of which is shown extending downwardly for engagement with a control 110. Struts 112a and 112b may be used to help support control rod drive support structure 106 and mechanisms 108.

Steam generator 98 may be of the once through type and divided into three sections each with its own feedwater inlet and outlet. Each section would then be capable of operating independently of the other two.

Several containment heat exchangers 113 are located in the containment vessel between the walls of pressure vessel 16 and vessel 12. Each heat exchanger 113 has an inlet pipe 114 and an outlet pipe 116 for circulating sea water to withdraw the heat accumulated in the containment water into which all heat losses are rejected. The sea water may be circulated through heat exchangers 113 to maintain the containment water at some convenient temperature such as approximately 110° F.

In addition to secondary heat exchangers 113 there are also provided a plurality of condensate tanks 118 located within the containment water. Tanks 118 are part of the auxiliary systems and, specifically, a part of the chemical control system of this reactor. During reactor start-up the chemical control system would be used as is understood in the art to inject de-mineralized water into reactor vessel 16 and this will reduce soluble poison concentration until the operating temperature at some power level is obtained. Subsequently, waterfeed and primary coolant bleed will reduce the soluble poison concentration in response to fuel burnup. Primary coolant bleed from the reactor would normally be discharged through a monitor line into the ship's prop wash. However, if intermediate holdup is required flow can be diverted into condensing tanks 118 until discharge is allowed.

Regarding core 40, there are seven control rods 110 which are Y-shaped as seen in FIG. 2. Each rod 110 passes completely through core 40 as shown. Six zircaloy plug rods 111 made also in a Y-shaped cross-section are disposed in the outer peripheral fuel elements. Rods 110 are adjustable by control rod mechanisms 108 to control the rate of nuclear fission in core 40 while plug rods 111 are provided to reduce the water gap in the six outer fuel elements which will be shuffled to the inner zone at the first reloading.

Core 40 consists of 37 fuel elements 20 hexagonal in cross-section and enclosed within a hexagonally shaped core container 122, formed by segments 124. Elements 20 are divided into two categories, those that provide for control rods or plugs rods, type A, and those which do not, type B. There are 13 elements of type A and 24 elements of type B in core 40. Each fuel element 120 is made up of segments as in the Sankovich et al. patent referred to above.

The type of fuel used in this arrangement is enriched $UO_2$.

The nominal enrichment is:

| | Percent |
|---|---|
| (1) Zone 1 | 1.6 ± 0.068 |
| (2) Zone 2 | 2.1 ± 0.068 |
| (3) Zone 3 | 3.1 ± 0.068 |

The total weight of U–235 is:

| | Kg. |
|---|---|
| (1) Zone 1 | 1.45 |
| (2) Zone 2 | 36.9 |
| (3) Zone 3 | 54.5 |

The total U–235 loading is 92.85 ± 1% kg. per core, and the total $UO_2$ loading is 4100 ± 1% kg. per core.

The zones refer to groups of fuel elements 120 distributed in radial fashion.

The table below lists some characteristics for the reactor just described.

Parameter:

| | |
|---|---|
| Reactor power, mwt. | 62.4 |
| Operating pressure, p.s.i.a. | 812 |
| Reactor flow rate, lb./hr. | $6 \times 10^6$ |
| Coolant outlet temperature, °F. | 520 |
| Coolant inlet temperature, °F. | 490 |
| Fuel | $UO_2$ |
| Cladding | Zircaloy |
| Fuel rod O.D., in. | 0.460 |
| Primary system coolant volumes, ft.$^3$ (approximate)— | |
|    Steam generator | 80 |
|    Cold leg | 375 |
|    Reactor (includes volume between reactor and 1st thermal shield) | 60 |
|    Hot leg, nominal | 180 |
|    Steam volume, nominal | 190 |
|    Total primary system | 695 |
| Primary system coolant masses, nominal, lb.— | |
|    Water mass | 34,100 |
|    Steam mass | 340 |
| Primary system stored heat, nominal B.t.u. | $18 \times 10^6$ |
| Transit times, sec.: | |
|    Steam generator outlet to reactor inlet | 10 |
|    Reactor outlet to steam generator inlet | 6 |

Completing arrangement 10, pipes 130 are provided to vent the space under vessel 16 and the space around closure 22. These spaces contain no water, and should a rupture occur water would enter into these spaces and form steam. The steam would be vented by pipes 130 and condensed in the containment water.

Nozzle penetrations 132 are for electrical and instrumentation wiring and tubes 134 are ion and fission chamber nozzles.

In the operation of the reactor described, pump 56 circulates the primary fluid up through chimney 74 and down through steam generators 98. The feedwater enters through pipes 88 into plenum 94, then down and up through steam generator 98. The generated steam leaves reactor 10 through pipes 102, plenum 104, pipes 92, and nozzles 14b, where the saturated or superheated steam is then available to be piped to the place of use. The excess heat developed in pressure vessel 16 passes through the walls of vessel 16 to heat up the water in the containment vessel 12. Heat exchangers 113 permit the rejected heat to be discharged to sea water, thus to limit the temperature of the containment water.

While not shown, the level of the water in reactor vessel 16 may be controlled manually or by any automatic means. For example, the level may be sensed by several magnetostrictive probes (not shown) installed in stillwells attached in the innermost steam generator downcomers.

The chemical control system, not forming a part of this invention, would provide water with soluble poisons to be injected into the primary system in response to the reactor control requirements and in accordance with well established nuclear procedures.

The primary system is self-pressurized by the space above the primary water in vessel 16. A steam space of approximately 190 cubic feet in the embodiment illustrated, for example, is provided there to absorb pressure fluctuation caused by temperature changes of the primary water. The use of spray nozzles and electric heaters previously mentioned may be used to maintain the steam space at the desired pressure.

It is thus seen that a very compact nuclear reactor steam generation arrangement has been provided. A major portion of the steam generation is confined within the walls of the containment. The geometry of the arrangement is such that there is adequate access to any point requiring maintenance. The outer containment vessel 12 and condensate tanks 118 absorb dumping and storage of primary system wastes when and if normal waste methods cannot be used. The layer of lead surrounding reactor vessel 16 serves as an effective gamma shield and also as a device to limit the flow of heat from the primary water to the containment water. This also serves to protect the reactor vessel 16 from contact with the containment water so as to prevent the existence of damaging temperature gradients.

While there is described and shown only a preferred embodiment of this invention, it is understood that many modifications are possible without departing from the principles of this invention as expressed in the appended claims.

We claim:

1. A consolidated nuclear vapor generator arrangement comprising, in combination, a closed pressure vessel, a hollow open-topped cylindrical chimney mounted vertically within said pressure vessel extending up from the bottom of said pressure vessel and forming an annular chamber with the wall of said pressure vessel, a reactive core with vertical coolant passages located in the lower central portion of said chimney, primary coolant filling said pressure vessel almost completely forming a primary fluid vapor space in the uppermost portion of said pressure vessel for maintaining pressurization of said pressure vessel, pump means mounted external and adjacent to said pressure vessel, means connecting said pump means to deliver primary coolant under pressure to within said chimney below said core and to receive primary coolant from around said chimney thereby establishing primary coolant flow up through said core and chimney and down through the annular space surrounding said chimney, vapor generation means mounted in the annular space surrounding said chimney for receiving heat from said primary coolant, means for delivering liquid feed to said vapor generation means, means for withdrawing vapor from the latter said means, means external to said pressure vessel for absorbing heat through said pressure vessel wall, and means lining said wall for limiting the flow of heat therethrough.

2. The arrangement of claim 1 in which said pump means is located at a level above the top of said core so that during removal of pump means the primary coolant level will always remain above said core.

3. The arrangement of claim 2 in which control rods extend down through said vessel and chimney for movement in and out of said core for exercising control over the rate of nuclear fission occurring in said core.

4. The arrangement of claim 3 in which thermal shielding means located in said annular space surround said core and said vapor generation means is located above said shielding means.

5. A consolidated nuclear steam generator arrangement comprising, in combination, an outer containment filled partially with secondary coolant, a sealed nuclear reactor pressure vessel immersed completely in said secondary coolant, a hollow, open-topped cylindrical chimney mounted vertically within said pressure vessel extending up from the bottom of said pressure vessel and forming an annular chamber, a reactive core with vertical cooling passages located in the lower central portion of said chimney, primary coolant almost completely filling said pressure vessel forming a vapor space in the uppermost portion of said pressure vessel for maintaining pressurization of said pressure vessel, pump means mounted in said containment vessel external to said pressure vessel, means connecting said pump means to deliver primary coolant under pressure to within said chimney thereby establishing primary coolant flow up through said core and chimney and down through the annular space surrounding said chimney, steam generation means mounted in the annular space surrounding said chimney for receiving heat from said primary coolant, means for delivering feedwater to said steam generation means, means for withdrawing steam from the latter said means, and heat exchange means within said containment vessel for absorbing heat from said containment coolant to maintain the latter at a satisfactory temperature level while receiving heat from said primary coolant through the walls of said pressure vessel.

6. A consolidated nuclear steam generator arrangement comprising, in combination, an outer containment filled partially with coolant water at approximately atmospheric pressure, a sealed nuclear reactor pressure vessel immersed completely in said coolant, a hollow, open-topped cylindrical chimney mounted vertically within said pressure vessel extending up from the bottom of said pressure vessel and forming an annular chamber, a reactive core with vertical cooling passages located in the lower central portion of said chimney, moderator-coolant water almost completely filling said pressure vessel forming a steam space in the uppermost portion of said pressure vessel for maintaining pressurization of said pressure vessel, pump means mounted in said containment vessel external to said pressure vessel at a level above the top of said core, means connecting said pump means to deliver moderator-coolant under pressure to within said chimney below said core and to receive moderator-coolant from around said chimney thereby establishing flow up through said core and chimney and down through the annular space surrounding said chimney, steam generation means mounted in the annular space surrounding said chimney for receiving heat from said moderator-coolant, means for delivering feedwater to said steam generation means, means for withdrawing steam from the latter said means, and heat exchange means within said containment vessel for absorbing heat from said containment water to maintain the latter at a satisfactory temperature level while receiving heat from said moderator-coolant through the walls of said pressure vessel.

7. The arrangement of claim 6 in which lead insulation lines the outside wall of said pressure vessel to provide effective gamma ray shielding and to limit transfer of heat from the moderator-coolant to the containment water.

8. The arrangement of claim 6 in which auxiliary tank means is located within said containment water for use normally as a source of additional water and for emergency use as temporary storage of nuclear wastes.

References Cited in the file of this patent
UNITED STATES PATENTS

| | | |
|---|---|---|
| 2,870,076 | Koch | Jan. 20, 1959 |
| 2,956,418 | McCann | Oct. 18, 1960 |
| 2,982,713 | Sankovich et al. | May 2, 1961 |
| 2,998,367 | Untermyer | Aug. 29, 1961 |

FOREIGN PATENTS

| | | |
|---|---|---|
| 835,266 | Great Britain | May 18, 1960 |